United States Patent Office 3,188,258
Patented June 8, 1965

3,188,258
BONDING OF OLEFIN POLYMERS
John Arthur Young, Bartlesville, Okla., assignor to Phillips Petroleum Company, a corporation of Delaware
No Drawing. Filed Dec. 30, 1957, Ser. No. 705,827
12 Claims. (Cl. 156—294)

This invention relates to bonding or joining the surfaces of olefin polymers to one another. In one aspect, it relates to a method for joining the surfaces of olefin polymers.

Various methods are described in the literature for producing normally solid and semisolid polymers. For example, hydrocarbons such as ethylene, propylene, isobutene, butadiene and styrene can be polymerized, either independently or in various admixtures with one another, to produce solid or semisolid polymers. Recently, considerable attention has been directed to the production of solid polymers of ethylene and/or propylene. The polymerizations are frequently carried out at low pressure in the presence of solid catalysts, and high molecular weight polymers, such as polyethylenes, have been produced which have properties superior to those of low density, low crystallinity polymers prepared by previously known methods. These polymers differ from the latter polymers, which can be produced by high pressure processes, particularly as regards their high crystallinity, which may be in excess of 90 percent at 25° C., and they are especially useful where high stiffness and high tensile strength are desired. These highly crystalline polymers are suitable for a wide variety of applications, a very important one being their use in the manufacture of plastic pipe. One important advantage in employing such materials in the manufacture of pipe is that pipe can be readily fabricated by extrusion methods. Furthermore, the plastic pipe is highly resistant to corrosion, thereby providing an important advantage over metal pipe. While the sections of plastic pipe can be joined by the use of threaded joints, the use of this joining method has not proven to be entirely satisfactory because under certain circumstances, e.g., when the pipe is subjected to vibration, there may be a tendency for the pipe to become unscrewed. Furthermore, in contrast to polymers having relatively low density and low crystallinity, the highly crystalline polymers cannot be joined together by such well known processes as solvent welding or hot gas welding. For example, pipe sections formed of polyethylene of relatively low density and low crystalinity can be joined by a process which comprises swelling a pipe sleeve in a solvent, placing the swollen sleeve over the ends of the pipe sections, and evaporating the solvent so as to shrink the sleeve onto the pipe sections. Because of the very limited solubility of the highly crystalline polymers, such a process cannot be used in joining pipe sections fabricated from such a polymer.

It is an object of the invention, therefore, to provide an improved method for joining or bonding the surfaces of highly crystalline olefin polymers.

Another object of the invention is to provide a method for joining sections of plastic pipe formed of highly crystalline olefin polymers.

Other and further objects and advantages of the invention will become apparent to those skilled in the art upon consideration of the accompanying disclosure.

Broadly speaking, the instant invention resides in a method for joining the surfaces of highly crystalline, high density, linear polyolefin structures, e.g., film, sheets or pipe sections, which comprises chemically bonding non-hydrocarbon substituents to the surfaces of the portions of the polymer structures to be joined together, the treated surfaces being in contact with one another during the addition or thereafter placed in contact with one another, thereby bonding the surfaces to one another. If desired, pressure may be applied to the surfaces which are in contact with one another in order to ensure good contact. Although it is preferred to add a halogen as the non-hydrocarbon substituent, e.g., by means of chlorination, other non-hydrocarbon substituents can be bonded to the polymer surfaces, e.g., by halosulfonation, sulfonation, nitration, and oxidation. Examples of non-hydrocarbon substituents which can be attached to the carbon atoms of the polymer by these latter methods are sulfo, halosulfonyl, nitro, hydroxy, peroxy and carboxy radicals.

As previously mentioned, the instant invention is particularly applicable to high density, highly crystalline solid polymers. These polymers often have an inherent viscosity of at least 0.8, preferably an inherent viscosity between 1.2 and about 10, as determined from a solution of 0.2 gram of polymer in 50 cc. of tetralin at 130° C. The polymers also have a crystallinity of at least 70 percent, preferably at least 80 percent, and more desirably at least 90 percent, at 25° C. The crystallinity of the polymers can be determined by measurements of nuclear magnetic resonance (Wilson and Pake, Journal of Polymer Science, 10, 503 (1953)), using a sample of polymer which is in a state aproaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by fall of about 1.5° C. per minute at 135° C. The crystallinity can also be determined according to the method of Matthews, Peiser and Richards, Acta Crystallographica, 2, 85 (1949). The softening point of the polymer will vary with the particular polymer used, increasing as the density and crystallinity of the polymer increases. Generally, the softening point of the high density solid polymer is about 250° F., preferably in the approximate range of 250 to 300° F., and is several degrees higher, e.g., about 10° F., than the melting point of the polymer.

Polymers having the above-described properties are preferably produced by the method set forth in the copending application of J. P. Hogan and R. L. Banks, Serial No. 573,877, filed March 26, 1956, and now issued as U.S. Patent No. 2,825,721. As described in detail in the Hogan and Banks application, the polymers to be treated in accordance with the present invention can be produced by contacting an aliphatic 1-olefin, such as ethylene or propylene, or mixtures of ethylene and other unsaturated hydrocarbons, e.g., mixtures of ethylene with minor amounts of monoolefins containing up to and including 6 carbon atoms per molecule, such as propylene, 1-butene, and 1-pentene, with a catalyst comprising as its essential ingredient from 0.1 to 10 or more weight percent chromium in the form of chromium oxide, preferably including a substantial amount of hexavalent chromium. The chromium oxide is ordinarily associated with at least one other oxide, particularly at least one oxide selected from the group consisting of silica, alumina, zirconia, and thoria. It is preferred that the plastic materials which are to be treated in accordance with this invention be formed from polymers of ethylene produced in accordance with the Hogan and Banks method. The term "polymers of ethylene" as used herein is intended to include polymers obtained by polymerizing ethylene and mixtures of ethylene and other unsaturated hydrocarbons.

Other polymers suitable for use in forming plastic materials to be treated in accordance with this invention can be obtained by other methods, e.g., by proceeding according to the processes disclosed by J. A. Reid in copending U.S. patent application Serial No. 494,281, filed March 14, 1955, and by H. D. Lyons and Gene Nowlin in copending U.S. patent application Serial No. 495,054, filed March 17, 1955. As disclosed in the first of these patent applications, a solid olefin polymer, such as a polymer of ethylene, can be produced by contacting ethylene with a catalyst comprising a mixture of an organometallic compound, such as an aluminum trialkyl, and a halide of a Group IV metal of the periodic table such as titanium tetrachloride. As disclosed in the latter of the aforementioned patent applications, an olefin, such as ethylene, is polymerized in the presence of a catalyst comprising an organometallic halide, such as ethylaluminum dichloride, and a halide of a Group IV metal, such as titanium tetrachloride, so as to provide a high molecular weight olefin polymer. While it is preferred because of their superior properties to employ polymers prepared as described hereinabove in forming the plastic materials which are to be treated in accordance with this invention, the invention is also applicable to plastic materials formed from other types of solid polymers, such as polyethylene having a low density and a low crystallinity.

As previously mentioned, the preferred non-hydrocarbon substituents, which are bonded to the surfaces of the plastic articles to be joined, are halogen atoms. When joining plastic sheets, the halogenation can be readily accomplished by immersing the ends of the sheets in a suitable liquid halogenated hydrocarbon, such as carbon tetrachloride or tetrachloroethane, and then introducing a halogen, such as elemental chlorine, into the liquid material. It is usually desirable to add only a small amount of chlorine to the polymer, e.g., from 0.5 to 5 weight percent, based on the polymer treated; however, if desired, amounts up to 10 weight percent and higher can be added to the polymer. It is usually preferred that the halogenation be effected in the presence of a catalyst. Thus, the reaction vessel in which the plastic articles are immersed can be irradiated with sunlight or artificial light. Ultraviolet light is often employed. Suitable catalysts also include peroxides and hydroperoxides, e.g., benzoyl peroxide, diisopropylbenzene hydroperoxide and cumene peroxide, and azo compounds, such as dimethyl and diethyl alpha,alpha'-azodiisobutyrate and alpha,alpha'-azodiisobutyronitrile. Although it is usually preferred to use elemental chlorine in the halogenation, other elemental halogens, such as bromine and iodine, can be employed. Furthermore, compounds, such as iodine chlorides, which furnish these halogens can be used as halogenating agents. The halogenation is carried out at a temperature below about 180° F., the temperature at which the polymer is soluble in the halogenated hydrocarbon. A temperature in the range of 50 to 180° F. is generally suitable for conducting the halogenation. However, it is within the scope of the invention to carry out the halogenation in the absence of a halogenated hydrocarbon, in which case the halogenation is conducted at a temperature below the softening point of the polymer.

After completion of the halogenation, the surfaces of the plastic articles are placed in contact with one another. It is within the scope of the invention to apply a thin coat of a solvent, which subsequently evaporates, to the polymer surfaces prior to their being brought into contact. Suitable solvents include paraffins, cycloparaffins and aromatics such as normal heptane, isooctane, cyclohexane, methylcyclohexane, benzene and toluene. While a good bond can be obtained at room temperature without the application of heat, some increase in the bond strength can be obtained by heating the bonded surfaces. However, the temperature of the polymer surfaces should not be raised above the polymer's softening point. The reason that a strong bond is formed between the polymer surfaces is not completely understood. However, it is believed that when the halogenated surfaces are brought into contact with one another, a chemical reaction occurs, thereby resulting in a chemical bond being formed between the surfaces.

When joining pipe sections, essentially the same procedure can be followed as described hereinabove with regard to polymer sheets. Thus, the ends of the pipe sections to be joined and a sleeve to be subsequently fitted over the ends of the pipe sections can be halogenated prior to their being placed into position. After the halogenation has been completed, the sleeve can be slipped onto the ends of the pipe sections which are then placed into contact with one another. It is also within the scope of the invention to carry out the halogenation with the pipe sections in position in the sleeve. When operating in this manner, a liquid halogenated hydrocarbon containing a dissolved halogenation agent, such as chlorine, is forced into the spaces between the inner surface of the sleeve and the outer surface of the pipe sections and the space between the ends of the pipe sections. This can be readily accomplished by drilling a hole in the sleeve at a point near that at which the ends of the pipe sections come into contact with one another.

Other methods can be employed to add hte non-hydrocarbon substitutents to the surfaces of the plastic articles to be joined. When nitration is employed, the surfaces can be treated with nitric acid at a temperature of at least 210° F. but below the softening point of the polymer. The nitric acid is preferably of an aqueous concentration within the range of 25 and 100 weight percent $HNO_3$. This method is particularly applicable to the highly crystalline polymers which have a softening point generally above 250° F. The polymer surfaces can also be sulfonated by bringing them into contact with fuming sulfuric acid or sulfur dioxide or oxidized by use of hydrogen peroxide, potassium permanganate or concentrated sulfuric acid. These latter treating methods are also carried out at a temperature below the softening point of the polymer. The amount of nitrogen, sulfur or oxygen added to the polymer surfaces by the above methods is small, from 0.5 to 5 weight percent, based on the polymer portion treated, generally being sufficient. It is also within the scope of the invention to add the non-hydrocarbon substituents by means of halosulfonation. When proceeding in accordance with this latter method, the polymer surfaces are generally immersed in a liquid halogenated hydrocarbon, such as carbon tetrachloride or tetrachloroethane, after which a hologen and sulfur dioxide are introduced into the liquid material. The halogen, e.g., chlorine, and the sulfur dioxide can be introduced either separately or simultaneously. It is also within the scope of the invention to utilize sulfonyl chloride as the chlorosulfonating agent. It is usually necessary to add only a small amount of chlorine and sulfur to the polymer, e.g., from 0.5 to 5 weight percent chlorine and a similar amount of sulfur. As in the previously described halogenation method, the chlorosulfonation is carried out at a temperature below about 180° F.

After the non-hydrocarbon substituents have been added to the polymer surfaces and before the surfaces have been placed in contact with one another, a curing or cross-linking agent can be added or applied to the polymer surfaces. When a solvent is also to be applied to the polymer surfaces, the curing agent can advantageously be in solution in the solvent. Examples of such agents which can be advantageously utilized include metal oxides, such as zinc oxide, sulfur, polysulfides, polyamino compounds, such as diaminobenzene, and the like. When joining polymer surfaces which have been halogenated, it has been found that an improvement in the bond strength can be obtained if a small amount, e.g., from 1 to 5 weight percent, of a halogen-containing polymer, such as chlorinated polyethylene or polyvinyl chloride, is dissolved in the solvent.

A more comprehensive understanding of the invention can be obtained by referring to the following illustrative examples, which are not intended, however, to be unduly limitative of the invention.

EXAMPLE I

Ethylene was polymerized in the presence of a chromium oxide-containing catalyst following a procedure described in the aforementioned Hogan and Banks patent application. The polymer of ethylene which was obtained had properties approximately equal to those set forth hereinbelow in Table I.

*Table I*

| | |
|---|---:|
| Softening temperature, °F.[1] | 260 |
| Density | 0.96 |
| Injection molded: | |
|     Tensile strength, p.s.i.[2] | 5100 |
|     Elongation, percent [3] | 28 |
| Compression molded: | |
|     Tensile strength, p.s.i. | 4200 |
|     Elongation, percent | 20 |
| Stiffness, p.s.i.[4] | 140,000 |
| Melt index [5] | 0.6 |
| Impact strength, Izod [6] (ft. lbs./in. notch) | 3.0 |
| Heat distortion, °F.[7] | 165 |
| Crystallinity, percent | above 92 |

[1] Adapted from method of Karrer, Davis and Dietrich, Ind. & Eng. Chem. (Anal. Ed.) 2, 96 (1930).
[2] ASTM D 638–52T.
[3] ASTM D 412–51T.
[4] ASTM D 747–50.
[5] ASTM D 1238–52T.
[6] ASTM D 256–54T.
[7] ASTM D 648–45T.

Test specimens of the above-described polymer were prepared by molding the polymer into slabs. The specimens were then suspended in carbon tetrachloride which was maintained at 60° C. Chlorine gas was bubbled into the carbon tetrachloride while irradiating with ultraviolet light for a period of 3.5 to 8 hours. After applying a thin coat of toluene to the surfaces of the specimens, the surfaces were overlapped and placed in a clamp at room temperature for 16 hours. The specimens so joined together were found to have the bond strengths set forth hereinbelow in Table II.

*Table II*

| Chlorination Time, hours: | Bond Strength, p.s.i. in shear |
|---|---:|
| 3.5 | 47 |
| 8.5 | 53.5 |

Other specimens of the polyethylene prepared as above-described were chlorinated in an atmosphere of chlorine gas for a period of one hour. The specimens were irradiated with ultraviolet light at room temperature during the chlorination. After completion of the chlorination, toluene was applied to the surfaces of the specimens which were then overlapped and placed in a clamp at room temperature for 16 hours. The bond strength of the bonded specimens was 30.5 p.s.i. in shear.

Specimens of the untreated polyethylene described above were coated with toluene, overlapped, and then placed in a clamp at room temperature for 16 hours. The untreated polyethylene specimens gave no bond.

EXAMPLE II

Specimens of the polyethylene described in Example I were chlorinated by suspending them in carbon tetrachloride at 60° C. Chlorine was bubbled into the solvent while irradiating with ultraviolet light for 3.5 hours. The surfaces of the specimens were then coated with a toluene solution containing 2 weight percent of chlorinated polyethylene. The chlorinated polyethylene used in the solution contained 30 weight percent chemically combined chlorine and was prepared from a polyethylene having properties similar to those described in Example I. The treated surfaces were overlapped, placed in a hand clamp and allowed to remain at 100° C. for 16 hours. The bond strength of the joined materials was 57.5 p.s.i. in shear.

From the foregoing, it is seen that a novel method has been provided for joining together and bonding the surfaces of olefin polymers. It will be apparent to those skilled in the art that variations and modifications of the invention can be made from a study of the foregoing disclosure. Such variations and modifications are believed to be clearly within the spirit and scope of the invention.

I claim:

1. A method for joining surfaces of structures of polymers of aliphatic 1-olefins, said polymers having a crystallinity of at least 70 percent at 25° C., which comprises halogenating the surfaces of the portions of said structures to be joined; wetting said surfaces with a liquid solvent selected from the group consisting of hydrocarbon solvents and halogenated hydrocarbon solvents; and placing the resulting treated surfaces in contact with one another, thereby causing said portions of said structures to be joined.

2. The method according to claim 1 wherein said polymers are polymers of ethylene having a crystallinity of at least 80 percent at 25° C.

3. The method according to claim 1 wherein said polymers are polymers of propylene.

4. The method according to claim 2 wherein said treated surfaces are heated after being placed in contact with one another, the temperature of heating being below the softening point of said treated surfaces.

5. A method for joining surfaces of structures of polymers of ethylene, said polymers having a crystallinity of at least 80 percent at 25° C., which comprises immersing the portions of said structures to be joined in a liquid halogenated hydrocarbon; introducing chlorine into said halogenated hydrocarbon maintained at a temperature in the range of 50 to 180° F.; removing said structures from said halogenated hydrocarbon when said portions contain from 0.5 to 5 weight percent chlorine; and with said surfaces wet with liquid solvent selected from the group consisting of hydrocarbon solvents and halogenated hydrocarbon solvents placing the resulting treated surfaces of said structures in contact with one another, thereby causing said portions of said structures to be joined.

6. In a method for joining sections of pipe utilizing a sleeve to be positioned over the ends of and in contact with the outer surfaces of said pipe sections, said pipe sections and said sleeve being formed of a polymer of ethylene having a crystallinity of at least 80 percent at 25° C., the steps of halogenating the outer surfaces of the ends of said pipe sections to be joined and the inner surface of said sleeve; wetting said surfaces with a liquid solvent selected from the group consisting of hydrocarbon solvents and halogenated hydrocarbon solvents; and positioning said sleeve over the treated outer surfaces of the ends of said pipe sections.

7. In a method for joining sections of pipe utilizing a sleeve to be positioned over the ends of and in contact with the outer surfaces of said pipe sections, said pipe sections and said sleeve being formed of a polymer of ethylene having a crystallinity of at least 80 percent at 25° C., the steps of immersing the ends of a pair of pipe sections to be joined and a sleeve in a liquid halogenated hydrocarbon; introducing chlorine into said halogenated hydrocarbon maintained at a temperature in the range of 50 to 180° F.; removing said pipe sections and said sleeve from said halogenated hydrocarbon when said pipe section ends and said sleeve contain from 0.5 to 5 weight percent chlorine; and with said surfaces wet with a liquid solvent selected from the group consisting of hydrocarbon solvents and halogenated hydrocarbon solvents positioning said sleeve over said ends of said pipe sections.

8. In a method for bonding the ends of a pair of pipe sections abutting one another and the outer surfaces of said pipe sections to the inner surface of a sleeve positioned over the junction of said pipe sections, said pipe sections and said sleeve being formed of a polymer of ethylene having a crystallinity of at least 80 percent at 25° C., the steps of forcing a liquid halogenated hydrocarbon containing dissolved chlorine between said abutting ends of said pipe sections and between said inner surface of said sleeve and said outer surfaces of said pipe sections.

9. The method of claim 4 wherein said surfaces are first halogenated and thereafter wetted with a hydrocarbon solvent.

10. The method of claim 4 wherein said surfaces are halogenated and wetted with a halogenated hydrocarbon solvent simultaneously.

11. The method of claim 4 wherein said surfaces are brought into contact and halogenated and wetted with a halogenated hydrocarbon solvent simultaneously by forcing said solvent with a halogenation agent between said surfaces.

12. A method of joining sections of pipe wherein the end of one pipe section is positioned snugly over the end of another pipe section, said pipe sections being formed from polymers of aliphatic 1-olefins, said polymers having a crystallinity of at least 70 percent at 25° C., which comprises halogenating the surfaces of said pipe sections which are to be in contact; wetting said surfaces with a liquid solvent selected from the group consisting of hydrocarbon solvents and halogenated hydrocarbon solvents; and holding the resulting treated surfaces in contact with one another, thereby causing said pipe sections to be joined.

References Cited by the Examiner

UNITED STATES PATENTS

| | | | |
|---|---|---|---|
| 2,480,296 | 8/49 | Burk. | |
| 2,502,841 | 4/50 | Henderson. | |
| 2,739,829 | 3/56 | Pedlow et al. | 156—294 |
| 2,774,705 | 12/56 | Smith | 154—139 |
| 2,786,783 | 3/57 | Hahn | 117—138.8 |
| 2,788,306 | 4/57 | Cox | 154—139 |
| 2,795,820 | 6/57 | Grow et al. | |
| 2,833,686 | 5/58 | Sandt | 154—139 |
| 2,838,437 | 6/58 | Busse. | |
| 2,919,059 | 12/59 | Sporka. | |
| 2,932,323 | 4/60 | Aires. | |
| 2,983,639 | 5/61 | Jageman et al. | 156—294 |

FOREIGN PATENTS

| | | |
|---|---|---|
| 129,806 | 11/48 | Australia. |
| 141,582 | 6/51 | Australia. |
| 149,982 | 2/53 | Australia. |

OTHER REFERENCES

Technology of Adhesives, by Delmonte, published in 1947 by Reinhold Publishing Corporation, 330 West 42nd Street, New York 18, New York, pp. 405, 413, 415.

EARL M. BERGERT, *Primary Examiner.*

R. LEIBOWITZ, ALEXANDER WYMAN, CARL F. KRAFFT, *Examiners.*